US012271786B2

(12) United States Patent
Brown et al.

(10) Patent No.: US 12,271,786 B2
(45) Date of Patent: Apr. 8, 2025

(54) PREPARATION OF A CZ STATE FOR QUANTUM COMPUTATION

(71) Applicant: INTERNATIONAL BUSINESS MACHINES CORPORATION, Armonk, NY (US)

(72) Inventors: Benjamin James Brown, Copenhagen (DK); Andrew W. Cross, Yorktown Heights, NY (US); Riddhi Swaroop Gupta, San Jose, CA (US); Tomas Raphael Jochym-O'Connor, Los Angeles, CA (US); Theodore James Yoder, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 18/053,087

(22) Filed: Nov. 7, 2022

(65) Prior Publication Data

US 2024/0152335 A1    May 9, 2024

(51) Int. Cl.
*G06N 10/70* (2022.01)
*G06N 10/20* (2022.01)

(52) U.S. Cl.
CPC ............. *G06N 10/70* (2022.01); *G06N 10/20* (2022.01)

(58) Field of Classification Search
CPC ............................... G06N 10/70; G06N 10/20
USPC ....................................................... 714/746
See application file for complete search history.

(56) References Cited

U.S. PATENT DOCUMENTS

| 10,846,608 | B2* | 11/2020 | Haah ..................... H04L 9/0858 |
| 2004/0109631 | A1* | 6/2004 | Franson ................. G06N 10/00 385/15 |
| 2020/0311593 | A1* | 10/2020 | Gidney ................ G11C 11/4063 |
| 2023/0032766 | A1* | 2/2023 | Neill ....................... G06N 10/20 |
| 2024/0152335 | A1* | 5/2024 | Brown .................. G06N 10/20 |

OTHER PUBLICATIONS

Anderson et al., "Implementing Fault-tolerant Entangling Gates on the Five-qubit Code and the Color Code", arXiv:2208.01863v1 [quant-ph] Aug. 3, 2022, 17 pages.
Bravyi et al., "Universal quantum computation with ideal Clifford gates and noisy ancillas", Physical Review A, vol. 71, 022316, published Feb. 22, 2005, pp. 022316-1-022316-14.
Chamberland et al., "Universal Quantum Computing with Twist-Free and Temporally Encoded Lattice Surgery", PRX Quantum 3, 010331, Published Feb. 25, 2022, pp. 010331-1-010331-25.
Chamberland et al., "Fault-tolerant magic state preparation with flag qubits", arXiv:1811.00566v2 [quant-ph], May 14, 2019, 26 Pages.

(Continued)

*Primary Examiner* — James C Kerveros
(74) *Attorney, Agent, or Firm* — Joseph P. Curcuru (57) ABSTRACT

According to an embodiment of the present invention, a method, system, and computer program product for preparing a CZ state for use in magic state distillation. The embodiment may include initializing a code state across data qubits. The embodiment may include measuring a CZ operator of the codes state on at least one ancilla qubit proximal to the data qubits. The embodiment may include performing additional quantum operations with the CZ state based on the measurement of the at least one ancilla qubit.

20 Claims, 7 Drawing Sheets

(56) References Cited

OTHER PUBLICATIONS

Chamberland et al. "Very low overhead fault-tolerant magic state preparation using redundant ancilla encoding and flag qubits", npj|Quantum Information, vol. 91, (2020), 12 pages.
Chao et al., "Quantum error correction with only two extra qubits", Physical Review Letters, vol. 121, 050502, published Aug. 1, 2018, pp. 050502-1-050502-5.
Chen et al., "Calibrated decoders for experimental quantum error correction", Physical Review Letters, vol. 128, 110504, published Mar. 17, 2022, pp. 110504-1-110504-7.
Dennis Eric, "Toward fault-tolerant quantum computation without concatenation", Physical Review A, vol. 63, 052314, published Apr. 19, 2001, pp. 052314-1-052314-6.
Divincenzo, "Fault-Tolerant Error Correction with Efficient Quantum Codes", Physical Review Letters, vol. 77, No. 15, Oct. 7, 1996, pp. 3260-3263.
Gidney et al., "Efficient magic state factories with a catalyzed |CCZ> to 2|T> transformation", arXiv:1812.01238v3 [quant-ph], Apr. 26, 2019, 24 Pages.
Li Ying, "A magic state's fidelity can be superior to the operations that created it", New Journal of Physics, vol. 17, Feb. 13, 2015, 8 Pages.

\* cited by examiner

COMPUTER 101

PROCESSOR SET 110
- PROCESSING CIRCUITRY 120
- CACHE 121

COMMUNICATION FABRIC 111

VOLATILE MEMORY 112

PERSISTENT STORAGE 113
- OPERATING SYSTEM 122
- QUANTUM CIRCUIT TRANSFORMATION MODULE 299

PERIPHERAL DEVICE SET 114
- UI DEVICE SET 123
- STORAGE 124
- IoT SENSOR SET 125

NETWORK MODULE 115

WAN 102

END USER DEVICE 103

REMOTE SERVER 104
- REMOTE DATABASE 130

PRIVATE CLOUD 106

GATEWAY 140

PUBLIC CLOUD 105
- CLOUD ORCHESTRATION MODULE 141
- HOST PHYSICAL MACHINE SET 142
- VIRTUAL MACHINE SET 143
- CONTAINER SET 144

PREPARATION OF A CZ STATE FOR QUANTUM COMPUTATION

BACKGROUND

The present invention relates to Quantum Computing, and more specifically, to gate initializations to improve the performance of quantum computers.

Magic state distillation is a process that takes in multiple noisy quantum states and outputs a smaller number of more reliable quantum states. Some quantum operations (i.e., Clifford Operations) can be simulated in polynomial time on a probabilistic classical computer. In order to achieve universal quantum computation, a quantum computer must be able to perform operations outside this set. Magic state distillation achieves this, in principle, by concentrating the usefulness of imperfect resources, represented by mixed states, into states that are conducive for performing operations that are difficult to simulate classically.

SUMMARY

According to an embodiment of the present invention, a method, system, and computer program product for preparing a CZ state for use in magic state distillation. The embodiment may include initializing a code state across data qubits. The embodiment may include measuring a CZ operator of the codes state on at least one ancilla qubit proximal to the data qubits. The embodiment may include performing additional quantum operations with the CZ state based on the measurement of the at least one ancilla qubit.

According to an embodiment of the present invention, that may be combined with the previous embodiment, the embodiment may further include initializing each data qubit in a state. The embodiment may include performing a Pauli-X stabilizer circuit with single qubit rotations onto each data qubit. The embodiment may include measuring the at least one ancilla qubit.

According to an embodiment of the present invention, that may be combined with the previous embodiment, the embodiment may include performing an additional correction to the data qubits based on the measurement result of the at least one ancilla qubit.

According to an embodiment of the present invention, that may be combined with the previous embodiment, the embodiment may include the additional correction comprises a X-rotation on a single qubit.

According to an embodiment of the present invention, that may be combined with the previous embodiment, wherein in the embodiment measuring the CZ operator may include performing a Pauli-X stabilizer circuit with specific single qubit rotations onto data qubits and measuring the ancilla qubit.

According to an embodiment of the present invention, that may be combined with the previous embodiment, the embodiment may include performing at least one error detecting measurement prior to performing additional operations with the CZ state.

According to an embodiment of the present invention, that may be combined with the previous embodiment, the embodiment may include reinitializing the CZ state across data qubits based on a measurement of the ancilla qubit.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
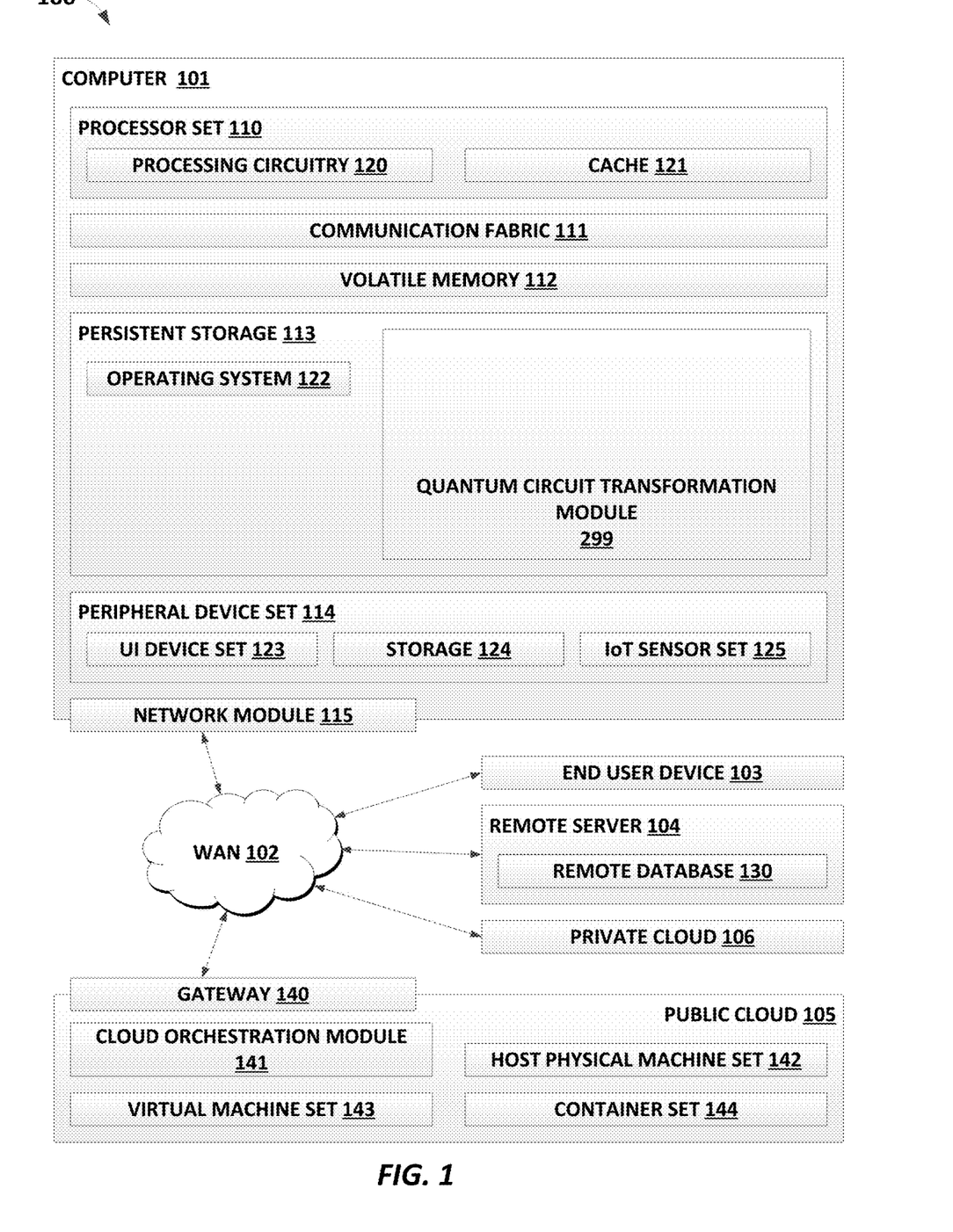
FIG. 1 depicts an classical computing system, according to an exemplary embodiment.

Computing environment 100 contains an example of an environment for the execution of at least some of the computer code involved in performing the inventive methods, such as CZ State Prep Protocol 299. In addition to CZ State Prep Protocol 299, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2A:
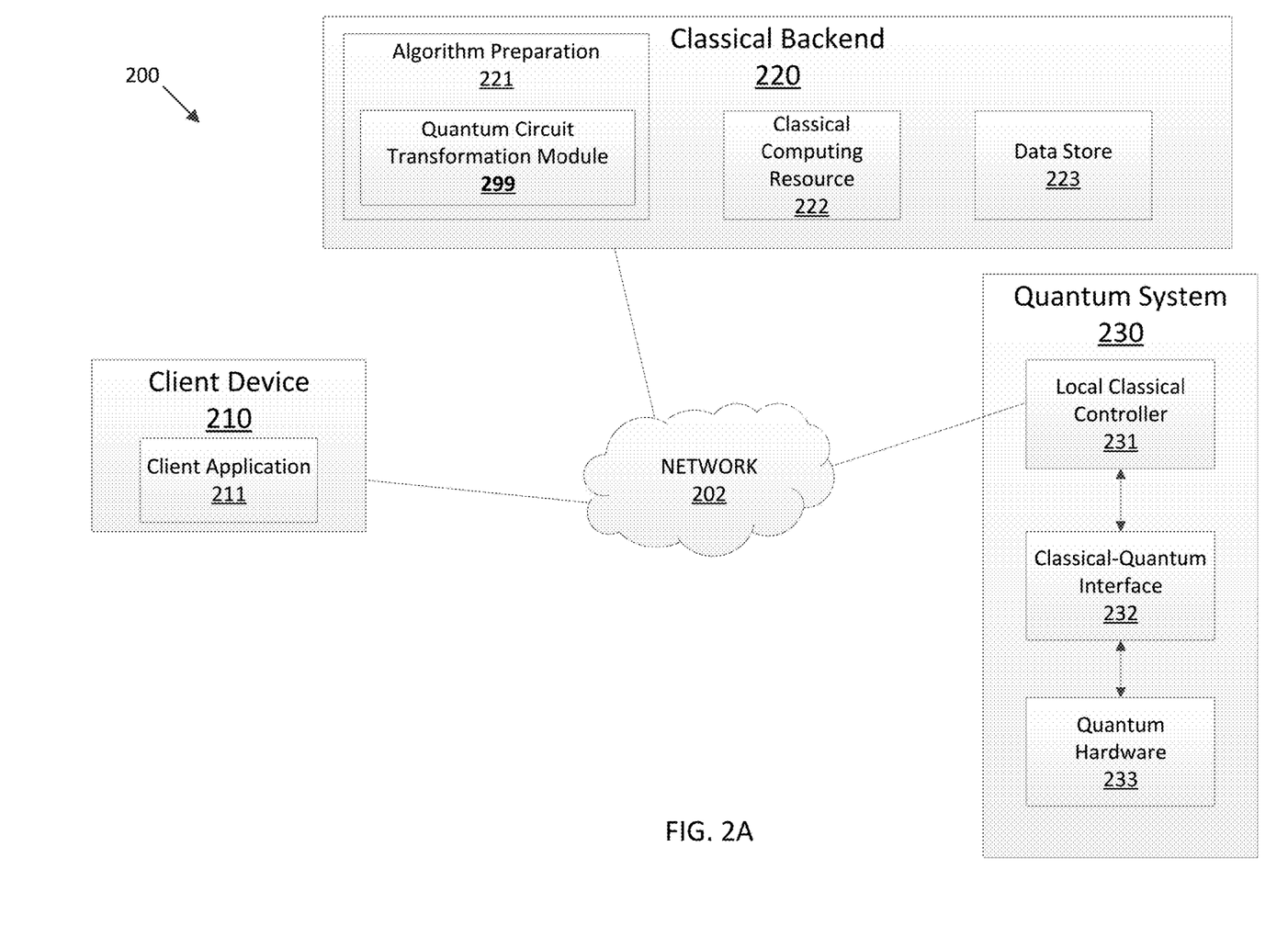
FIG. 2A depicts an environment containing classical and quantum computers for performing quantum and hybrid computations, according to an exemplary embodiment.

FIG. 2A illustrates a block diagram of an example hybrid computing system 200 that can facilitate execution of a quantum algorithm. As shown, a client device 210 may interface with a classical backend 220 to enable computations with the aid of a quantum system 230.

Network 202 may be any combination of connections and protocols that will support communications between the client device 210, the classical backend 220, and the quantum system 230. In an example embodiment, network 202 may WAN 102.

Client device 210 may be an implementation of computer 101 or EUD 103, described in more detail with reference to FIG. 1, configured to operate in a hybrid computing system 200.

Client application 211 may include an application or program code that includes computations requiring a quantum algorithm or quantum operation. In an embodiment, client application 211 may include an object-oriented programming language, such as Python® ("Python" is a registered trademark of the Python Software Foundation), capable of using programming libraries or modules containing quantum computing commands or algorithms, such as QISKIT ("QISKIT" is a registered trademark of the International Business Machines Corporation). In another embodiment, client application 211 may include machine level instructions for performing a quantum circuit, such as OpenQASM. Additionally, user application may be any other high-level interface, such as a graphical user interface, having the underlying object oriented and/or machine level code as described above.

The classical backend 220 may be an implementation of computer 101, described in more detail with reference to FIG. 1, having program modules configured to operate in a hybrid computing system 200. Such program modules for classical backend 220 may include algorithm preparation 221, classical computation 222, and data store 223.

Algorithm preparation 221 may be a program or module capable of preparing algorithms contained in client application 211 for operation on quantum system 230 and includes CZ State Prep Protocol 299. Algorithm preparation 221 may be instantiated as part of a larger algorithm, such as a function call of an API, or by parsing a hybrid classical-quantum computation into aspects for quantum and classical calculation. Algorithm preparation 221 may additionally compile or transpile quantum circuits that were contained in client application 211 into an assembly language code for use by the local classical controller 231. During transipilation/compilation an executable quantum circuit in the quantum assembly language may be created based on the calculations to be performed, the data to be analyzed, and the available quantum hardware. In one example embodiment, algorithm preparation 221 may select a quantum circuit from a library of circuits that have been designed for use in a particular problem. In another example embodiment, algorithm preparation 221 may receive a quantum circuit from the client application 211 and may perform transformations on the quantum circuit to make the circuit more efficient, or to fit the quantum circuit to available architecture of the quantum processor 233. Additionally, algorithm preparation 221 may prepare classical data from data store 223, or client application 211, as part of the assembly language code for implementing the quantum circuit by the local classical controller 231. Algorithm preparation 221 may additionally set the number of shots (i.e., one complete execution of a quantum circuit) for each circuit to achieve a robust result of the operation of the algorithm. Further, algorithm preparation 221 may update, or re-compile/re-transiple, the assembly language code based on parallel operations occurring in classical computing resource 222 or results received during execution of the quantum calculation on quantum system 230. Additionally, algorithm preparation 221 may determine the criterion for convergence of the quantum algorithm or hybrid algorithm.

CZ State Prep Protocol 299 may form a portion of algorithm preparation 221. CZ State Prep Protocol 299 may include instructions, such as a circuit for creating quantum states on quantum hardware 233, for creating a CZ magic state for use in a quantum computation for quantum system 230. Specifically, CZ State Prep Protocol 299 may create a code state on physical qubits. A measurement of the CZ operator of the code state may confirm whether there was an acceptable preparation of the code state. The state may then undergo further error checks to determine whether state is prepared. The CZ state may then undergo further quantum operations, such as magic state distillation and use in quantum calculations. The operations of CZ State Prep Protocol 299 are discussed in more detail in with respect to FIG. 3A, FIG. 3B, FIG. 5A, and FIG. 5B.

Classical computing resource 222 may be a program or module capable of performing classical (e.g., binary, digital) calculations contained in client application 211. Classical calculations may include formal logical decisions, AI/ML algorithms, floating point operations, and/or simulation of Quantum operations.

Data store 223 may be a repository for data to be analyzed using a quantum computing algorithm, as well as the results of such analysis. Data store 223 may be an implementation of storage 124 and/or remote database 130, described in more detail with reference to FIG. 1, configured to operate in a hybrid computing system 200.

The quantum system 230 can be any suitable set of components capable of performing quantum operations on a physical system. In the example embodiment depicted in FIG. 2, quantum system 230 includes a local classical controller 231, a classical-quantum interface 232, and quantum processor 233. In some embodiments, all or part of each of the local classical controller 231, a classical-quantum interface 232, and quantum processor 233 may be located in a cryogenic environment to aid in the performance of the quantum operations. In an embodiment, classical backend 220 and quantum system 230 may be co-located to reduce the communication latency between the devices.

Local classical controller 231 may be any combination of classical computing components capable of aiding a quantum computation, such as executing a one or more quantum operations to form a quantum circuit, by providing commands to a classical-quantum interface 232 as to the type and order of signals to provide to the quantum processor 233. Local classical controller 231 may additionally perform other low/no latency functions, such as error correction, to enable efficient quantum computations. Such digital computing devices may include processors and memory for storing and executing quantum commands using classical-quantum interface 232. Additionally, such digital computing devices may include devices having communication protocols for receiving such commands and sending results of the performed quantum computations to classical backend 220. Additionally, the digital computing devices may include communications interfaces with the classical-quantum interface 232. In an embodiment, local classical controller 231 may include all components of computer 101, or alternatively may be individual components configured for specific quantum computing functionality, such as processor set 110, communication fabric 111, volatile memory 112, persistent storage 113, and network module 115.

Classical-quantum interface 232 may be any combination of devices capable of receiving command signals from local classical controller 231 and converting those signals into a format for performing quantum operations on the quantum processor 233. Such signals may include electrical (e.g., RF, microwave, DC) or optical signals to perform one or more single qubit operations (e.g., Pauli gate, Hadamard gate, Phase gate, Identity gate), signals to preform multi-qubit operations (e.g., CNOT-gate, CZ-gate, SWAP gate, Toffoli gate), qubit state readout signals, and any other signals that might enable quantum calculations, quantum error correction, and initiate the readout of a state of a qubit. Additionally, classical-quantum interface 232 may be capable of converting signals received from the quantum processor 233 into digital signals capable of processing and transmitting by local classical controller 231 and classical backend 220. Such signals may include qubit state readouts. Devices included in classical-quantum interface 232 may include, but are not limited to, digital-to-analog converters, analog-to-digital converters, waveform generators, attenuators, amplifiers, filters, optical fibers, and lasers.

Quantum processor 233 may be any hardware capable of using quantum states to process information. Such hardware may include a collection of qubits, mechanisms to couple/entangle the qubits, and any required signal routings to communicate between qubits or with classical-quantum interface 232 in order to process information using the quantum states. Such qubits may include, but are not limited to, charge qubits, flux qubits, phase qubits, spin qubits, and trapped ion qubits. The architecture of quantum processor 233, such as the arrangement of data qubits, error correcting qubits, and the couplings amongst them, may be a consideration in performing a quantum circuit on quantum processor 233.

Figure 2B:
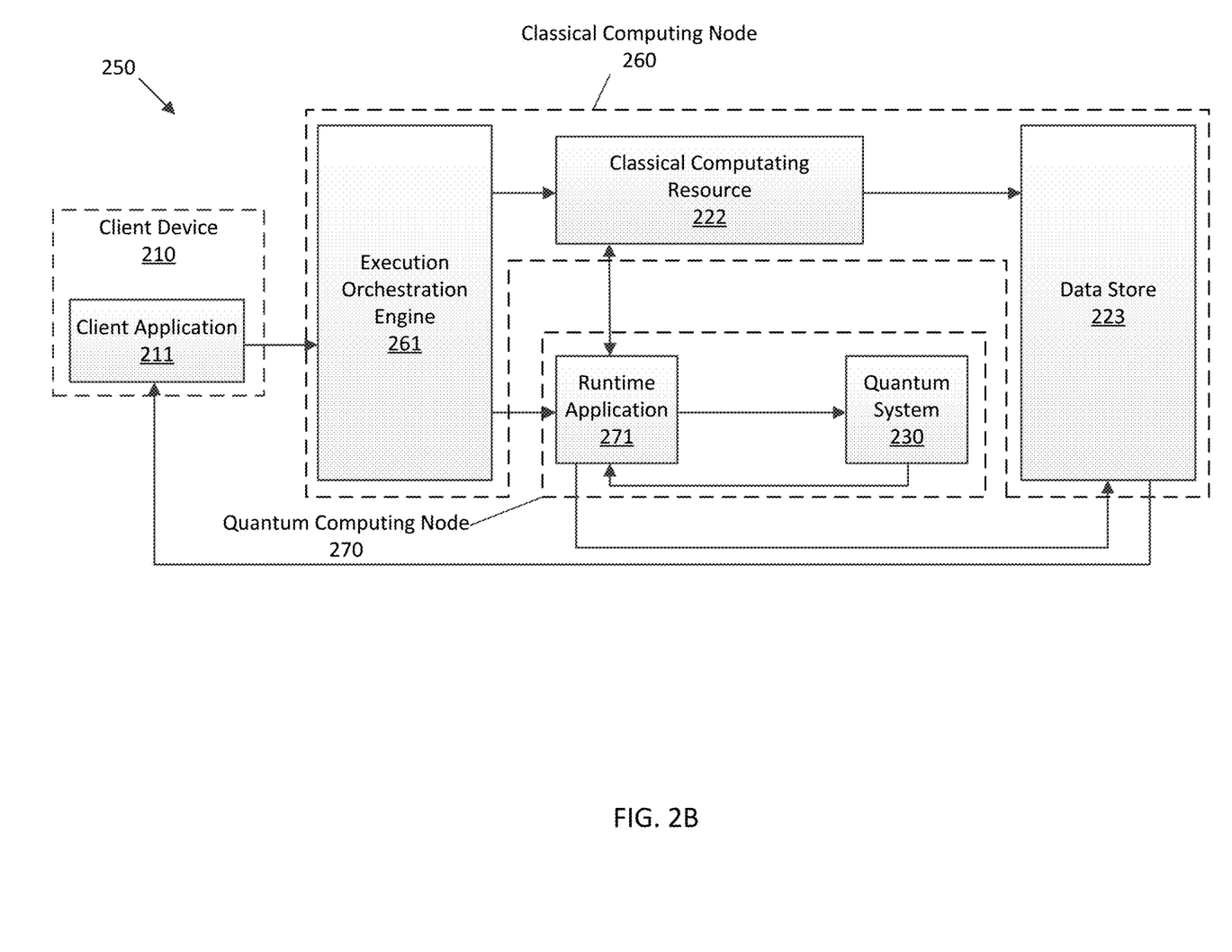
FIG. 2B depicts an example process flow for performing quantum and hybrid computations using the classical and quantum computers of FIG. 2A, according to an exemplary embodiment.

Referring now to FIG. 2B, a block diagram is depicted showing an example architecture, and data transmission, of hybrid computation system 250 employed using a cloud architecture for classical backend 220. Hybrid computation system 250 receives an algorithm containing a computation from a client application 211 of client device 210. Upon receipt of the algorithm and request from client application 211, hybrid computation system 250 instantiates a classical computing node 260 and a quantum computing node 270 to manage the parallel computations. The classical computing node 260 may include one or more classical computers capable of working in tandem. For example, classical computing node 260 may include an execution orchestration engine 261, one or more classical computation resources 222, and a result data store 223. The backend quantum runtime system 202 may include a combination of classical and quantum computing components acting together to perform quantum calculations on quantum hardware including, for example, one or more quantum systems 230. The quantum computing node 270 may include a quantum runtime application 271 and one or more quantum systems 230.

The client application 211 may include programing instructions to perform quantum and classical calculations. In an embodiment, client application 211 may be in a general purpose computing language, such as an object oriented computing language (e.g., Python®), that may include classical and quantum functions and function calls. This may enable developers to operate in environments they are comfortable with, thereby enabling a lower barrier of adoption for quantum computation.

The execution orchestration engine 261, in using algorithm preparation 221, may parse the client application 211 into a quantum logic/operations portion for implementation on a quantum computing node 270, and a classical logic/operations portion for implementation on a classical node 260 using a classical computation resource 222. In an embodiment, parsing the client application 211 may include performing one or more data processing steps prior to operating the quantum logic using the processed data. In an embodiment, parsing the client application 211 may including segmenting a quantum circuit into portions that are capable of being processed by quantum computing node 270, in which the partial results of each of the segmented quantum circuits may be recombined as a result to the quantum circuit. Execution orchestration engine 261 may parse the hybrid algorithm such that a portion of the algorithm is performed using classical computation resources 222 and a session of quantum computing node 270 may open to perform a portion of the algorithm. Quantum runtime application 271 may communicate, directly or indirectly, with classical computation resources 222 by sending parameters/information between the session to perform parallel calculations and generate/update instructions of quantum assembly language to operate quantum system 230, and receiving parameters/information/results from the session on the quantum system 230. Following the parsing of the hybrid algorithm for calculation on quantum computing node 270 and classical computing node 260, the parallel nodes may iterate the session to convergence by passing the results of quantum circuits, or partial quantum circuits, performed on quantum system 230 to classical computing resource 222 for further calculations. Additionally, runtime application 271, using algorithm preparation 221, may re-parse aspects of the hybrid algorithm to improve convergence or accuracy of the result. Such operation results, and progress of convergence, may be sent back to client device 210 as the operations are being performed. By operating execution orchestration engine 261 in a cloud environment, the environment may scale (e.g., use additional computers to perform operations necessary) as required by the client application 211 without any input from the creators/implementors of client application 211. Additionally, execution orchestration engine 261, while parsing the client application 211 into classical and quantum operations, may generate parameters, function calls, or other mechanisms in which classical computation resource 222 and quantum computing node 270 may pass information (e.g., data, commands) between the components such that the performance of the computations enabled by client application 211 is efficient.

Classical computation resources 222 may perform classical computations (e.g., formal logical decisions, AI/ML algorithms, floating point operations, simulation of Quantum operations) that aid/enable/parallelize the computations instructed by client application 211. By utilizing classical computation resources 222 in an adaptively scalable environment, such as a cloud environment, the environment may scale (e.g., use additional computers to perform operations necessary including adding more classical computation resources 222, additional quantum systems 230, and/or additional resources of quantum systems 230 within a given quantum computing node 270) as required by the client application 211 without any input from the creators/implementors/developers of client application 211, and may appear seamless to any individual implementing client application 211 as there are no required programming instructions in client application 211 needed to adapt to the classical computation resources 222. Thus, for example, such scaling of quantum computing resources and classical computing resources may be provided as needed without user intervention. Scaling may reduce the idle time, and thus reduce capacity and management of computers in classical computing node 260.

Result data store 223 may store, and return to client device 210, states, configuration data, etc., as well as the results of the computations of the client application 211.

Implementation of the systems described herein may enable hybrid computing system 200, through the use of quantum system 230, to process information, or solve problems, in a manner not previously capable. The instantiation of more accurate quantum states, by CZ State Prep Protocol 299, may reduce the number of iterations of magic state distillation required to achieve an accurate quantum state for use in quantum computing. This may reduce circuit depth, and the number of qubits necessary, to achieve efficient and accurate quantum calculations from the quantum system 230. Additionally, the quantum assembly language created by classical backend 220 may enable quantum system 230 to use quantum states to perform calculations in a more efficient and accurate manner by enabling more efficient non-Clifford gates through the creation of a more accurate CZ state and magic state distillation.

Figure 3A:
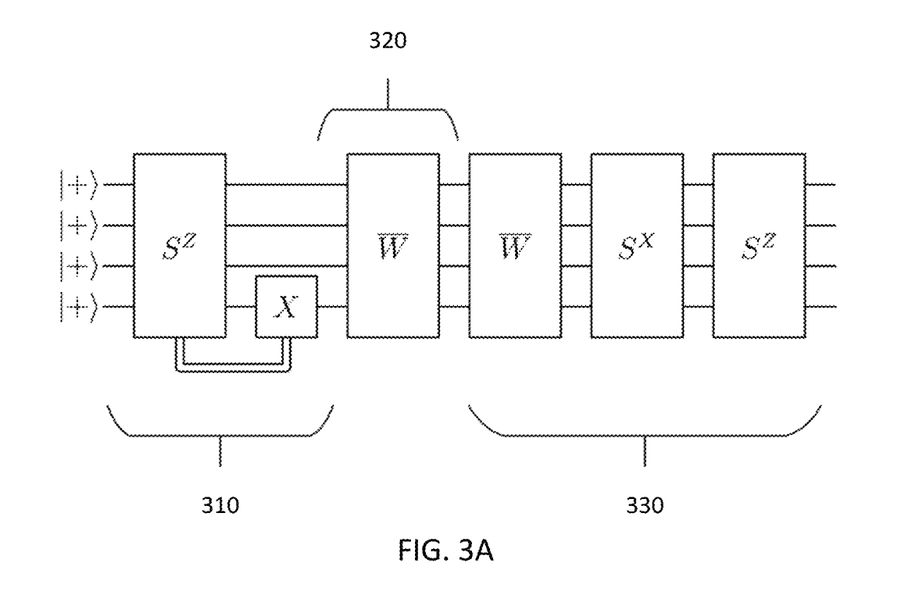
FIG. 3A depicts a circuit for preparing the CZ state onto 4 data qubits, according to an exemplary embodiment.
Figure 3B:
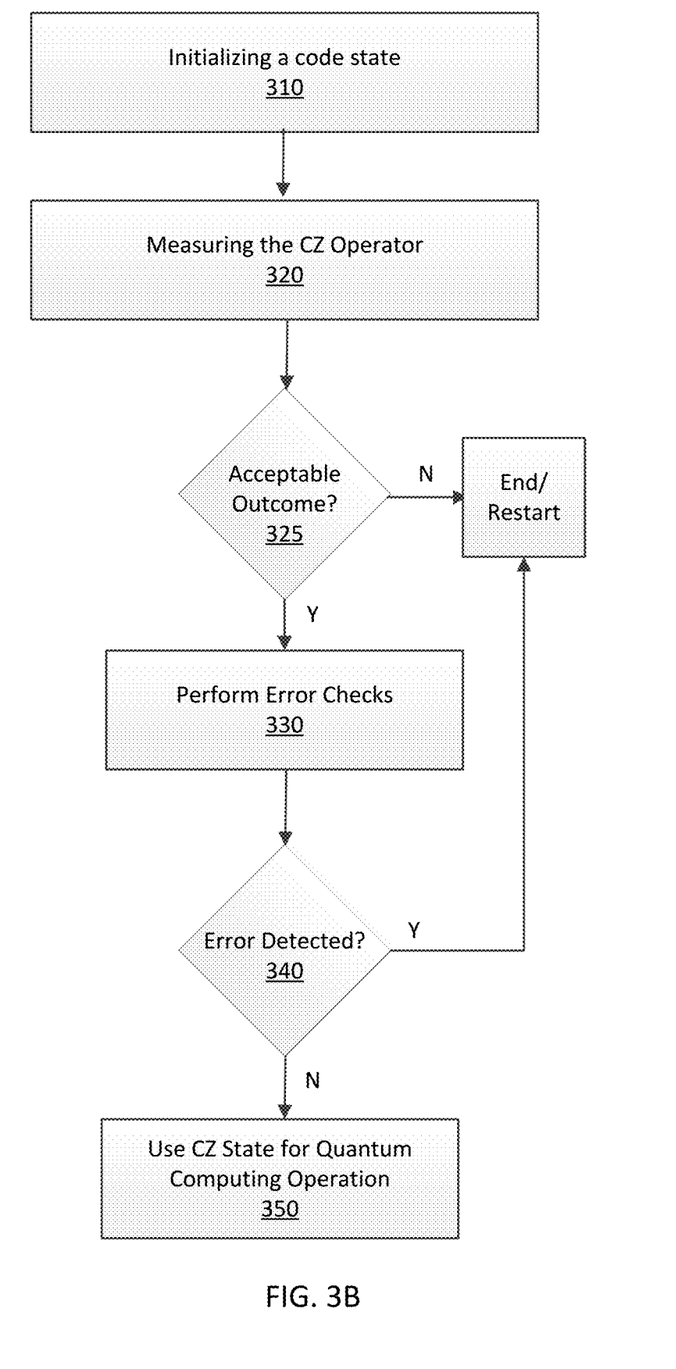
FIG. 3B depicts a flowchart describing the operations of the circuit of FIG. 3A, according to an exemplary embodiment.

Referring to FIG. 3A and FIG. 3B, a method of creating an initial state prior to initializing the CZ operator is depicted. Referring to step 310, the qubits are prepared for measurement by the CZ operator. The initial state on the physical qubits is |0000>+|1111>+|0101>+|1010>+|1100>+|0011>+|1001>+|0110>. In the circuit depicted in FIG. 3A, this is accomplished by setting 4 data qubits to an initial |+⟩ vector prior to performing a $S^z$ stabilizer circuit. Following the stabilizer circuit, an ancilla qubit (such as a flag qubit) may be measured. Successful measurements may proceed to step 320. Unsuccessful measurements would lead to a reinitialization according to the current step. Some measurement results may be corrected using a feed forward rotational gate, such as an X-gate on at least one of the data qubits. Alternatively, the initial code state may be obtained through post selection (i.e., only based on successful measurement and without the feed forward rotational gate).

Referring to step 320, the initialized CZ operator, W, is measured to determine whether qubits prepared for the CZ operator in step 310 exhibit the correct states. After, if there is an acceptable outcome of the measurement, the states of the physical qubits are |0000>+|1111>+|0101>+|1010>+|1100>+|0011>. The measurement of the CZ operator may be performed by conjugating a Pauli-X stabilizer, $S^x$, with a gate rotation applied to each physical qubit. In an example embodiment, in which a T gate rotation is applied, the resulting operation W≈(T⊗T†⊗T†⊗T) $S^x$ (T†⊗T⊗T⊗T†). Following this conjugation, an ancilla qubit may be measured.

Referring to step 325, if a state of the ancilla qubit is acceptable (i.e., +1 state), the method proceeds to step 330. If the state of the ancilla qubit is not acceptable (i.e., not +1) the method ends, and can be repeated from step 310.

Referring to step 330, error checks may be performed to detect if any errors have occurred. As depicted in the circuit, the CZ operator, W, may be reperformed to determine if there were any other types of errors associated with performance of the original gate. Additionally, an X-stabilizer circuit, $S^x$, and a Z-stabilizer circuit, $S^z$, may be performed to identify errors that may have occurred in steps 310, 320, and 330.

Referring to step 340, if a state of the ancilla qubits is acceptable, the method proceeds to step 350. If the state of the ancilla qubits is not acceptable the method ends, and can be repeated from step 310.

Referring to step 350, subsequent quantum operations may be using the created CZ state. For example, magic state distillation may further refine the state to achieve an error tolerant CZ state. Additionally, such states may be used in the creation of other states, such as Toffoli states, and each of these states may be used to perform quantum computations or other magic state distillation protocols.

Figure 4:
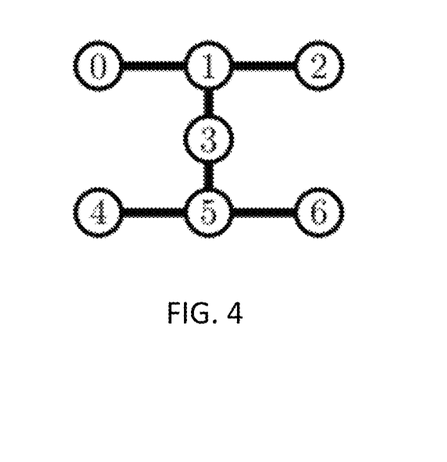
FIG. 4 depicts an example qubit architecture, according to an exemplary embodiment.

Referring to FIG. 4, an example qubit architecture is depicted. In the figure, qubits are depicted as circles (capable of undergoing single qubit rotations) while couplings between qubits (capable of enabling 2 qubit operations) are depicted as lines. In the example architecture qubits 0, 2, 4, and 6 are data qubits; qubits 1 and 5 are flag qubits; and qubit 3 is an ancilla qubit. As should be understood, the 7 qubit architecture may be part of a larger lattice structure.

Figure 5:
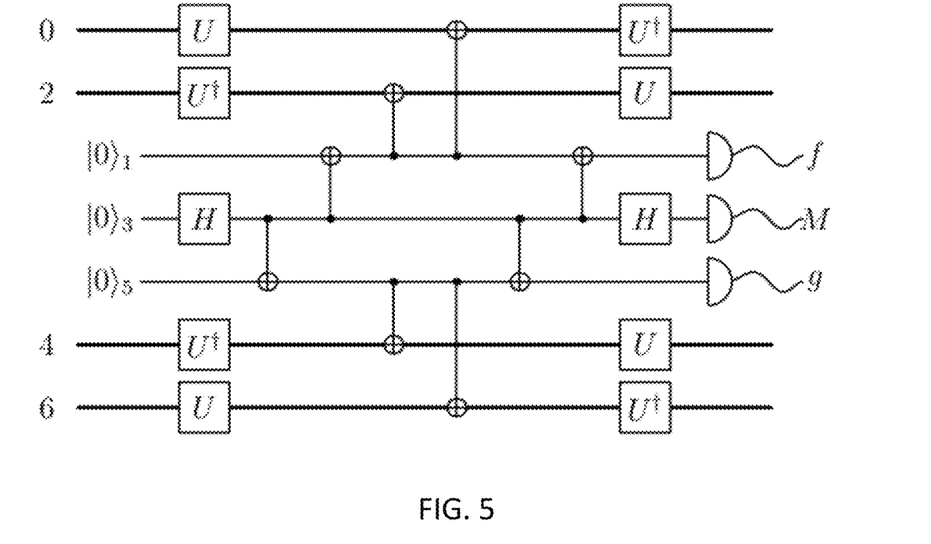
FIG. 5 depicts an example implementation of the circuit of FIG. 3A onto the qubit architecture of FIG. 4.

Referring to FIG. 5, depicted is an example set of gate operations for performing the functions of FIG. 3A on the qubit architecture of FIG. 4. In the example circuit when performing the measurement of the CZ operator, W, U represents a T-gate, and the conjugate where noted, and a measurement M is taken at ancilla qubit 3. In such a circuit a measurement of +1 signifies a valid CZ state. In the example circuit when performing the $S^x$ stabilizer, U represents an Identity gate, and the conjugate where noted, and measurements f and g are taken at ancilla qubits 1 and 5. In the example circuit when performing the $S^z$ stabilizer, U represents a Hadamard gate, and the conjugate where noted, and measurements f and g are taken at ancilla qubits 1 and 5.

Figure 6:
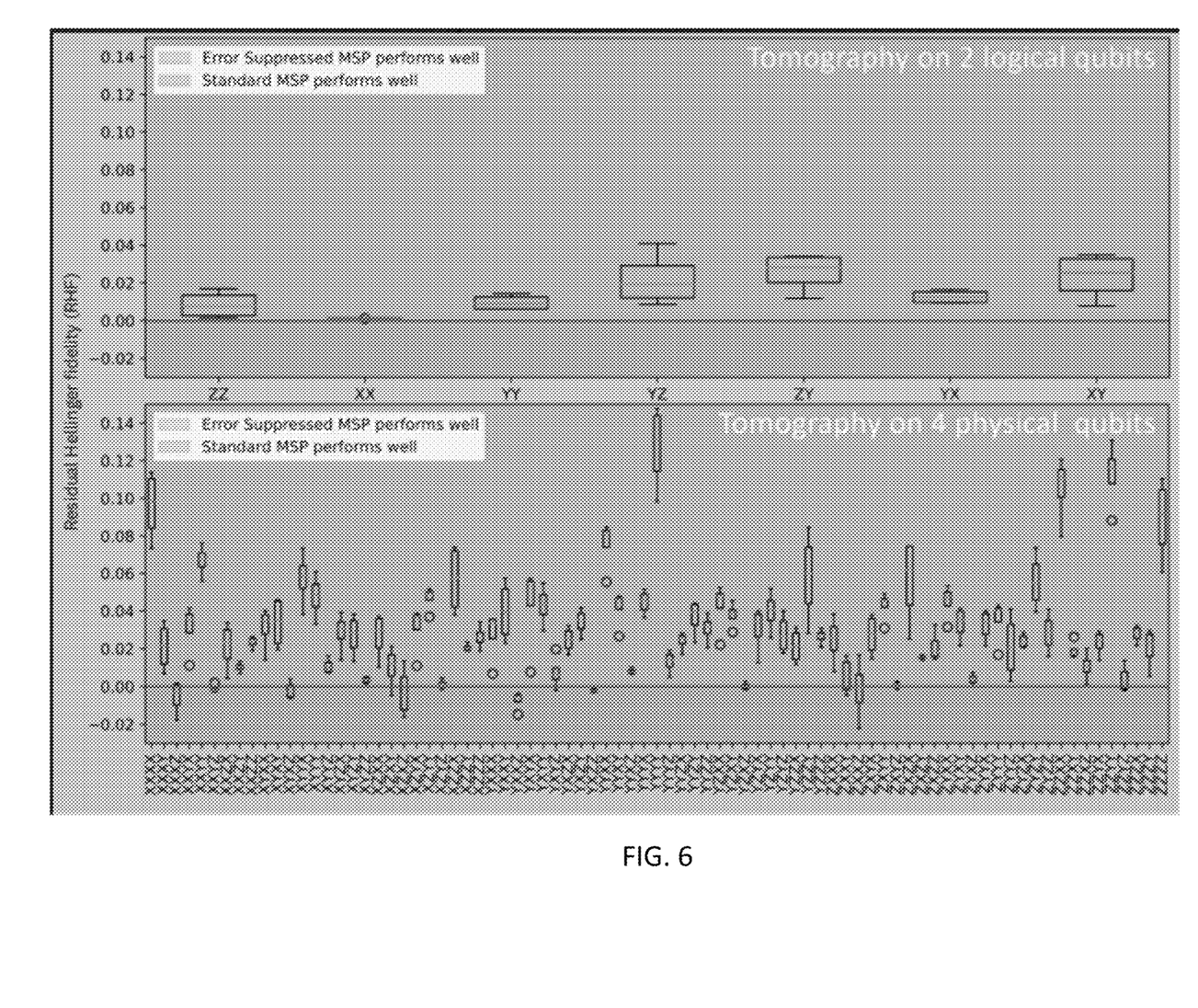
FIG. 6 depicts the error reduction of the circuit of FIG. 3A compared to the standard technique.

Referring to FIG. 6, depicted is tomography data for CZ states using the methods proscribed in the FIGS. 3A and 3B compared to a common method in which the magic state is manually prepared on physical qubits which are subsequently encoded onto the desired code. In the depicted graph, the 0.0 measurement shows the baseline, where the current method and the standard method are equal. Values in the positive depict states in which the current method has a better residual Hellinger Fidelity (RHG), while negative states in which the standard methods a better RHF. As shown, the current method outperforms the standard method for both the two logical-qubit subspace and the four physical-qubit Hilbert space.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
 initializing a code state across data qubits, wherein an initial code state is obtained through post selection;
 measuring a CZ operator of the codes state on at least one ancilla qubit proximal to the data qubits; and
 based on the measurement of the at least one ancilla qubit, performing additional quantum operations with the CZ state.

2. The method of claim 1, wherein initializing the code state across data qubits comprises: initializing each data qubit in a state;
 performing a Pauli-X stabilizer circuit with single qubit rotations onto each data qubit; and
 measuring the at least one ancilla qubit.

3. The method of claim 2 further comprising based on the measurement result of the at least one ancilla qubit, performing an additional correction to the data qubits.

4. The method of claim 3, wherein the additional correction comprises a X-rotation on a single qubit.

5. The method of claim 1, wherein measuring the CZ operator comprises:
 performing a Pauli-X stabilizer circuit with specific single qubit rotations onto data qubits; and
 measuring at least one ancilla qubit.

6. The method of claim 1 further comprising:
performing at least one error detecting measurement prior to performing additional operations with the CZ state.

7. The method of claim 6, wherein the at least one error detecting measurement comprises:
performing a Pauli-X stabilizer circuit with a single qubit rotation onto data qubits; and
measuring at least ancilla qubit.

8. The method of claim 1 further comprising reinitializing the CZ state across data qubits based on a measurement of the ancilla qubit.

9. A system comprising one or more processors, one or more computer readable memories, one or more computer readable storage devices, one or more computer-readable storage devices, one or more classical-quantum interfaces, and one or more quantum hardware and program instructions stored on the one or more computer readable storage devices for execution by one or more processors via the one or more memories to operate the one or more classical-quantum interface to operate the one or more quantum hardware according the program instructions, the program instructions comprising instructions for:
initializing a code state across data qubits;
measuring a CZ operator of the codes state on at least one ancilla qubit proximal to the data qubits; and
based on the measurement of the at least one ancilla qubit, performing additional quantum operations with the CZ state.

10. The system of claim 9, wherein initializing the code state across data qubits
comprises: initializing each data qubit in a state;
performing a Pauli-X stabilizer circuit with single qubit rotations onto each data qubit; and
measuring the at least one ancilla qubit.

11. The system of claim 10 further comprising based on the measurement result of the at least one ancilla qubit, performing an additional correction to the data qubits.

12. The system of claim 11, wherein the additional correction comprises a X-rotation on a single qubit.

13. The system of claim 9, wherein measuring the CZ operator comprises:
performing a Pauli-X stabilizer circuit with specific single qubit rotations onto data qubits; and
measuring the ancilla qubit.

14. The system of claim 13 further comprising:
performing at least one error detecting measurement prior to performing additional operations with the CZ state.

15. A computer program product comprising one or more processors, one or more computer readable memories, one or more computer readable storage devices, one or more computer-readable storage devices, and program instructions stored on the one or more computer readable storage devices for execution by one or more processors via the one or more memories, the program instructions comprising instructions for:
initializing, on quantum hardware, a code state across data qubits;
measuring a CZ operator of the codes state on at least one ancilla qubit proximal to the data qubits; and
based on the measurement of the at least one ancilla qubit, performing additional quantum operations with the CZ state.

16. The computer program product of claim 15, wherein initializing the code state across data qubits comprises:
initializing each data qubit in a state;
performing a Pauli-X stabilizer circuit with single qubit rotations onto each data qubit; and
measuring the at least one ancilla qubit.

17. The computer program product of claim 16 further comprising based on the measurement result of the at least one ancilla qubit, performing an additional correction to the data qubits.

18. The computer program product of claim 17, wherein the additional correction comprises a X-rotation on a single qubit.

19. The computer program product of claim 15, wherein measuring the CZ operator comprises:
performing a Pauli-X stabilizer circuit with specific single qubit rotations onto data qubits; and
measuring the ancilla qubit.

20. The computer program product of claim 19 further comprising:
performing at least one error detecting measurement prior to performing additional operations with the CZ state.

* * * * *